(12) United States Patent
Nolton et al.

(10) Patent No.: US 11,971,175 B1
(45) Date of Patent: Apr. 30, 2024

(54) THIN FILM FAUX FIREPLACE WITH TWO-SIDED VIEW

(71) Applicant: Modern Flames, LLC, Phoenix, AZ (US)

(72) Inventors: Jim Nolton, Scottsdale, AZ (US); Kris Richardson, Tempe, AZ (US); Harland Aguirre, Glendale, AZ (US); David Faszer, Gilbert, AZ (US)

(73) Assignee: MODERN FLAMES, LLC, Phoenix, AZ (US)

( * ) Notice: Subject to any disclaimer, the term of this patent is extended or adjusted under 35 U.S.C. 154(b) by 0 days.

(21) Appl. No.: 18/244,011

(22) Filed: Sep. 8, 2023

Related U.S. Application Data

(60) Provisional application No. 63/530,965, filed on Aug. 5, 2023.

(51) Int. Cl.
*F21S 10/04* (2006.01)
*F24C 7/00* (2006.01)
*G03B 21/132* (2006.01)
*G03B 21/60* (2014.01)

(52) U.S. Cl.
CPC ............ *F24C 7/004* (2013.01); *G03B 21/132* (2013.01); *G03B 21/60* (2013.01)

(58) Field of Classification Search
CPC ........... A63J 5/023; F24C 7/004; F21S 10/04; G03B 21/132; G03B 21/60
See application file for complete search history.

(56) References Cited

U.S. PATENT DOCUMENTS

| | | | |
|---|---|---|---|
| 2006/0162198 A1* | 7/2006 | Hess | F21S 10/04 40/428 |
| 2008/0138050 A1* | 6/2008 | Moreland | F24C 7/004 392/348 |
| 2018/0257335 A1* | 9/2018 | Matsuo | B32B 27/40 |
| 2022/0413375 A1* | 12/2022 | Tong | H04N 9/3194 |

FOREIGN PATENT DOCUMENTS

| | | | | |
|---|---|---|---|---|
| CA | 3074543 A1 | * | 9/2020 | ............ F24B 1/1808 |
| CN | 207230706 U | * | 4/2018 | |

* cited by examiner

*Primary Examiner* — Cassandra Davis
(74) *Attorney, Agent, or Firm* — Culhane Meadows PLLC; Robert C. Klinger (57) ABSTRACT

A thin faux fireplace that can be installed in a wall, such as a 2"×4" wall, having a faux flame viewable from both sides of the faux fireplace. A transparent material, such as glass, is coated with a thin film having nano sized particles, and an ultra short-throw projector displays the faux flame on the thin film. A user can see object on the other side of the faux fireplace, and also view the faux flame on the thin film rooms on both sides of the transparent material.

20 Claims, 8 Drawing Sheets

FIG. 10 ly transparent. Thin film 20 is critical to render faux flame 16 using ultra short-throw projector 18, and is also substantially transpar-

THIN FILM FAUX FIREPLACE WITH TWO-SIDED VIEW

PRIORITY

This application claims priority to U.S. Provisional Patent Application U.S. Ser. No. 63/530,965 filed Aug. 5, 2023, entitled Thin Film Faux Fireplace with Two-Sided view, the teachings of which are incorporated herein in its entirety.

TECHNICAL FIELD

The present disclosure relates to faux fireplaces that generate realistic faux flames for homes, apartments, hotels, commercial buildings, and other confined locations.

BACKGROUND

Faux fireplaces are commonly used in personal homes, condominiums, apartments and the like to generate a faux (synthetic or simulated) flame when a real burning fireplace is not allowable or preferred.

This disclosure includes a faux fireplace designed to eliminate the challenges and disadvantages commonly associated with gas or wood burning fireplaces without compromising the realism of the flames.

DETAILED DESCRIPTION

This disclosure includes a faux fireplace having a two-sided view. A front surface of a thin transparent material has a substantially transparent thin film configured to receive a projected faux flame from an ultra short-throw projector. The projected faux flame is viewable from both sides of the faux fireplace, and a user can also view through the display and see objects on the other side of the faux fireplace, such as a room. The thin film has nano particles configured to render the faux flame and is at least 85% transparent.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and circuitry have been described at a relatively high-level, without detail, in order to avoid unnecessarily obscuring aspects of the present teachings.

Figure 1:
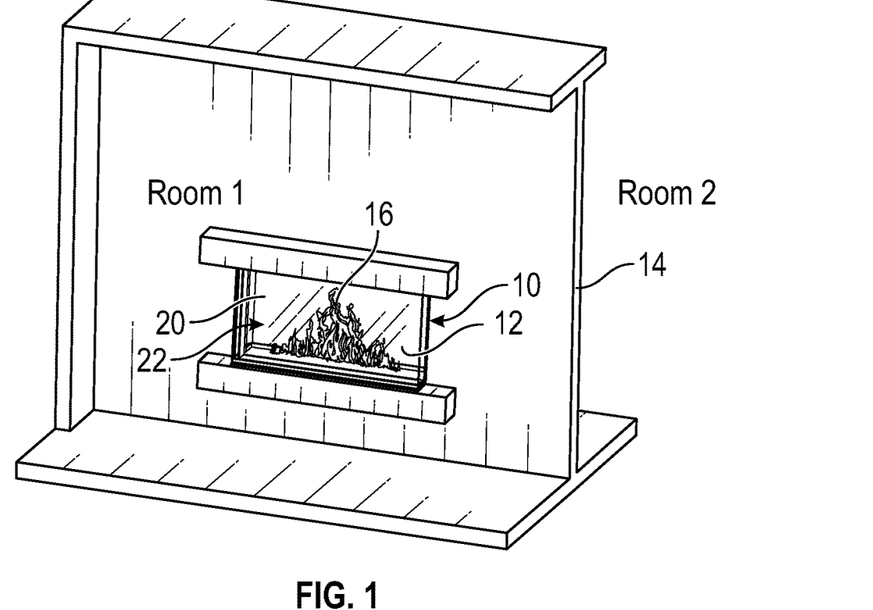
FIG. 1 and FIG. 2 each illustrate a perspective view of a thin faux fireplace generating a faux flame that is viewable from each side of the faux fireplace.
Figure 2:
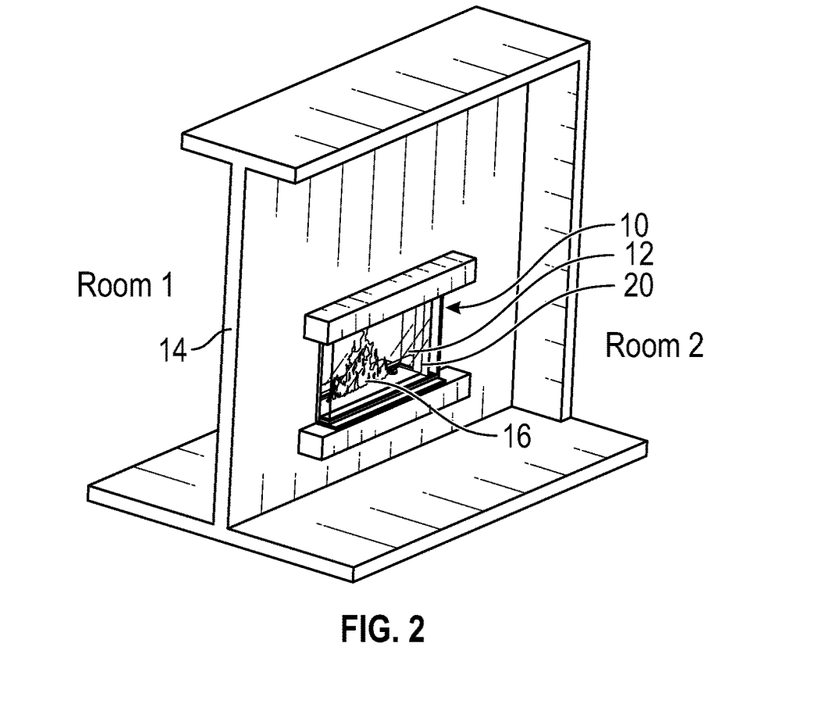

The term "coupled" as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light, sound, or signals, FIG. 1 and FIG. 2 illustrate a perspective view of a thin faux fireplace 10 including a single sheet of vertically extending transparent material, show as glass at 12. Faux fireplace 10 is configured to be mounted in a vertical wall 14 of a building, such as a 2"×4" or 2"×6" wall separating two rooms, and a window opening of a building. Faux fireplace 10 displays an image of a flame, referred to herein as faux flame 16, on a thin film 20 disposed on a front surface of glass 12, wherein faux flame 16 is viewable from a first room, and also from a second room positioned on an opposing side of wall 14. Glass 12 is supported by a support member. Glass 12 is positioned between a front glass 26 and a rear glass 28 (FIG. 4), and may have a thickness of 1" or less such that glass 12 is recessed in wall 14.

Figure 3:
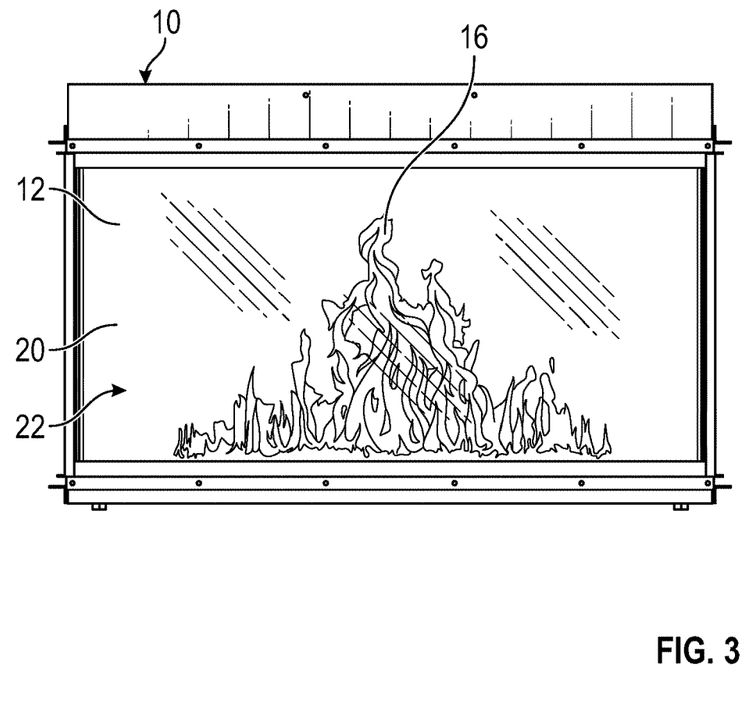
FIG. 3 is a front view of the faux fireplace, wherein objects on the other side of faux fireplace are viewable by a user.

FIG. 3 illustrates a front view of faux fireplace 10. A viewer can see through glass 12 to see objects in the room on the other side of glass 12.

Figure 4:
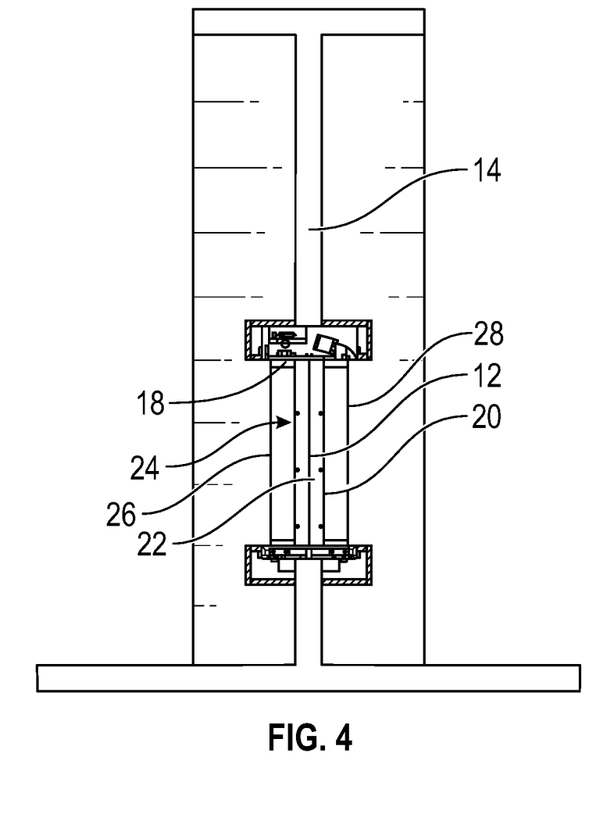
FIG. 4 is side view of the faux fireplace installed in a wall of a building.

As shown in FIG. 4, faux flame 16 is projected by an image generator 18, such as a video projector, and displayed on a thin film 20 comprised of nano sized particles and formed on a front surface 22 of glass 12, referred to herein as nanoparticles. Image generator 18 projects an image such as an ultra short-throw video projector. In an example shown, image generator 18 is positioned above and slightly forward of glass 12 that projects a high-resolution image of faux flame 16 at a low throw angle 24, such as at 30 degrees or less, on front surface 22, referred to as an angle of incidence on thin film 20. An ultra short-throw projector is defined as a projector where the projector throw distance is 4 feet or less. In another example, ultra short-throw video projector 18 can be coupled to a base of faux fireplace 10 and project faux flame 16 upwardly at front surface 22 at a similar low throw angle 24. In this example, video projector 18 directs faux flame 16 upwardly where media of ember bed 54 (FIG. 5) is cleared to allow direct imaging onto front surface 22 without obstruction. A front glass 26 and a rear glass 28 encompass glass 12 that includes thin film 20 and faux logs 52 (FIG. 5), such that glass 12 is interposed between front glass 26 and rear glass 28.

In a specific example when faux fireplace 10 is installed in a vertical wall, or window opening for example as illustrated, it is critical that throw angle 24 be 20 degrees or less from the film 20 vertical plane. In another example, for a narrow wall or window opening, throw angle 24 can be between 15 and 20 degrees.

Thin film 20 is critical to render faux flame 16 using ultra short-throw projector 18, and is also substantially transparent such that a user can easily see through glass 12 and see objects on the other side of glass 12, and further allows a user on the other side of glass 12 to also see a bright enough high-resolution faux flame 16 with high contrast. Thus, thin film 20 is unique and provides multiple critical purposes.

Thin film 20 has nanoparticles that render the projected image of faux flame 16, wherein faux flame 16 is displayed on the nano sized particles and is viewable from both sides of glass 12. Nano sized particles are defined as particles having a diameter of less than 1 micron. The size and density of the nanoparticles is specific such that thin film 20 is substantially transparent, which in this application is defined as at least 85% transparent and above.

An example of a suitable thin film 20 is available from Photonic Crystal Co, such as the NanoAR film referred to as HB1. The image quality of faux flame 16 viewable from both sides of glass 12 is of high quality, wherein the contrast ratio of faux flame 16 viewable on the front side of glass 12 is slightly better than when viewed from a back side of glass 12.

Figure 5:
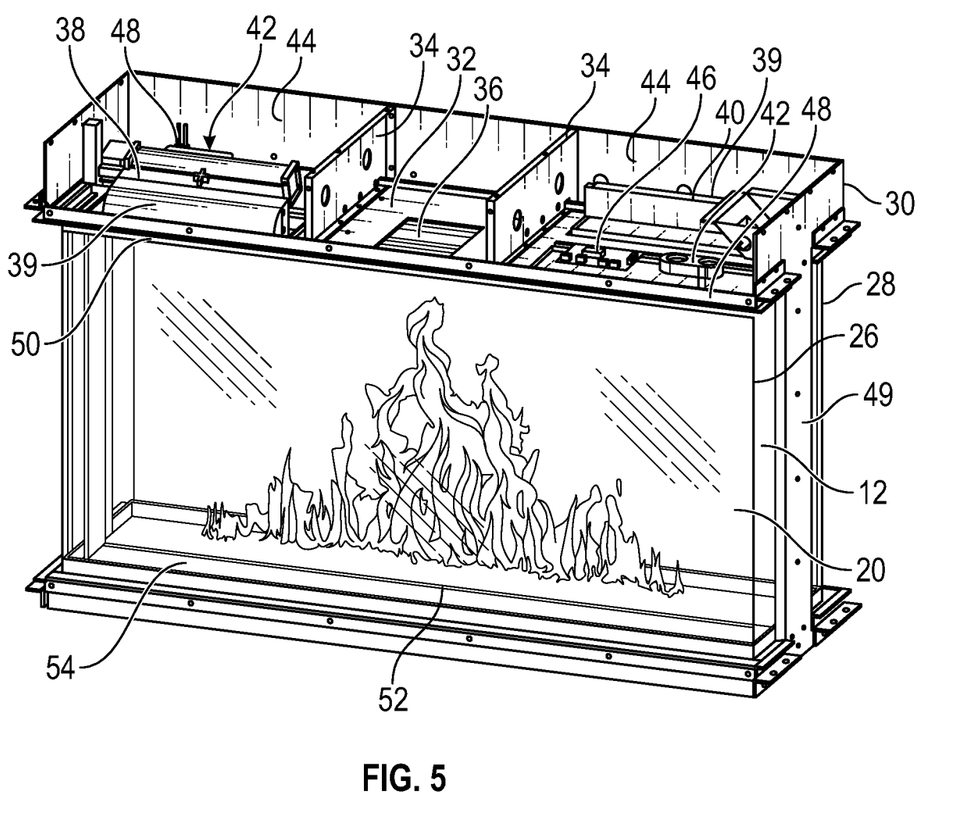
FIG. 5 illustrates an enlarged perspective view of faux fireplace including a top portion.
Figure 8:
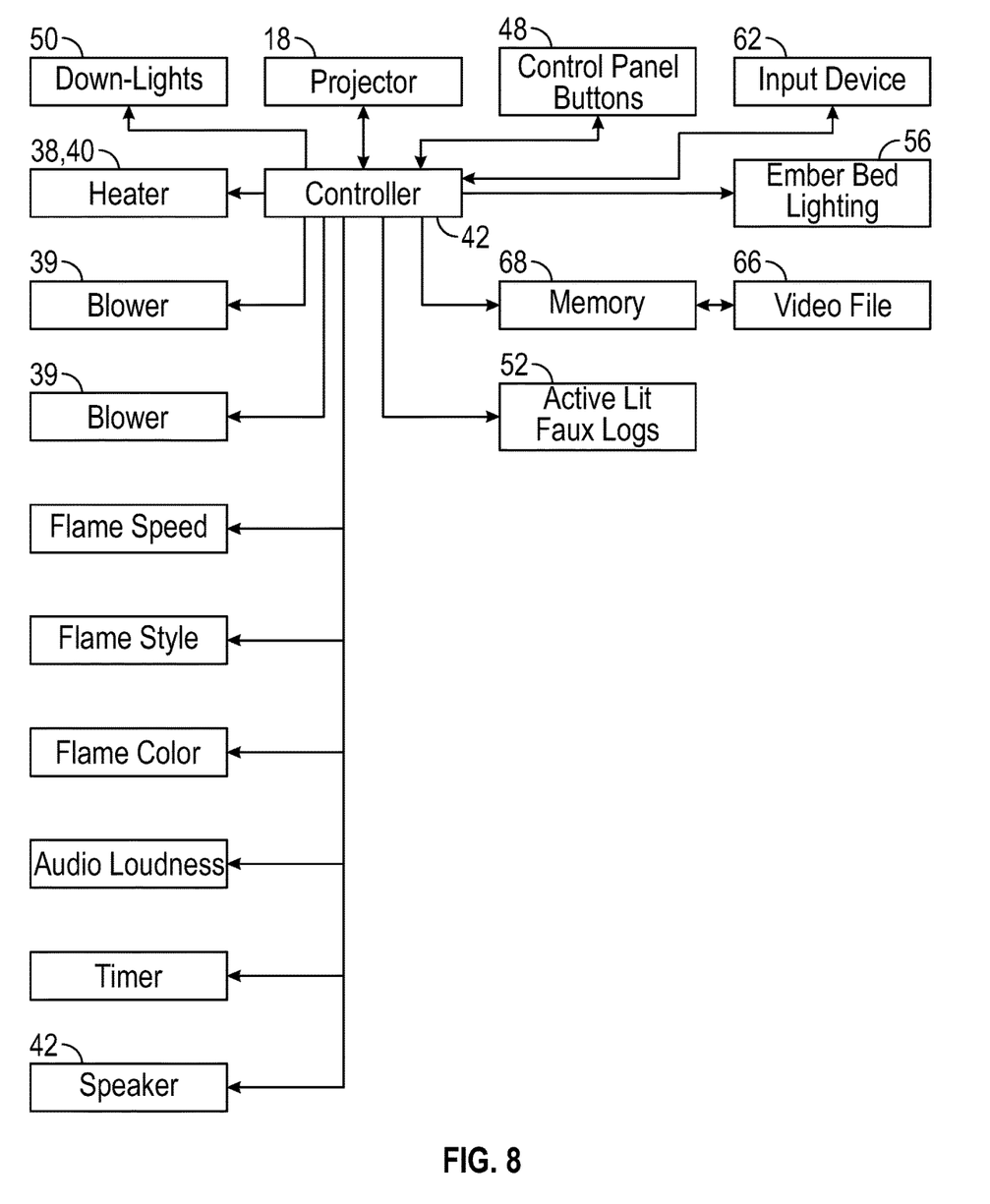
FIG. 8 is an electrical block diagram of faux fireplace.

FIG. 5 illustrates an enlarged perspective view of faux fireplace 10 including a top portion 30 including a projector cavity 32 formed between a pair of heat separators 34 and is configured to hold video projector 18. Video projector 18 is configured to project the generated faux flame 16 through a transparent window 36 of top portion 30, such as comprised of glass or plexiglass. Top portion 30 includes a first heater 38 having a blower 39 configured to selectively direct heat outward in front of glass 12, and a second heater 40 having a separate blower 39 configured to selectively direct heat outwardly behind glass 12 (FIG. 8). The heat separators 34 keep the heat generated by the heaters 38 and 40 away from video projector 18. Speaker 42 is provided in a receptacle 44 formed each side of separators 34 and are configured to generate sound, such as flame crackling sounds and music in response to signals from a controller 46, such as a processor. A touch control 48 is provided along an upper portion of faux fireplace 10 that is accessible from the respective side of glass 12, such that a user in each room can control faux fireplace 10, such as to control flame color, flame display speed, brightness, and other features of the faux fireplace 10. A pair of vertically extending side supports 49 extend downwardly from top portion 30 and secure the assembly including glass 12. The side supports 49 also extend upwardly from a base of faux fireplace 10. A front and back multi-colored downlight 50 is formed in top portion 30 that shines light downwardly on a respective side of glass 12. Downlights 50 illuminate active lit faux logs 52 formed on top of respective active multi-color ember bed 54 and disposed in front of and in back of glass 12, at a bottom portion on each side of glass 12. Ember bed 54 may be formed of a plastic (e.g., Polystyrene or Acrylic) ember bed screen (white color) acting as a diffusion material for the underlaying ember bed lighting 56 (FIG. 8). Media, such as glacier crystals or crushed glass, is laid on top of the ember bed screen to emulate a glowing ember bed of an actual fireplace. Ember bed lighting 56 is positioned uniformly to not create bright and dim spots on the ember bed screen. Ember bed lighting 56 and the downlights 50 may be created by a light emitting diode (LED), or the like. The lighting may be comprised of red/green/blue (RGB) lighting.

Figure 6:
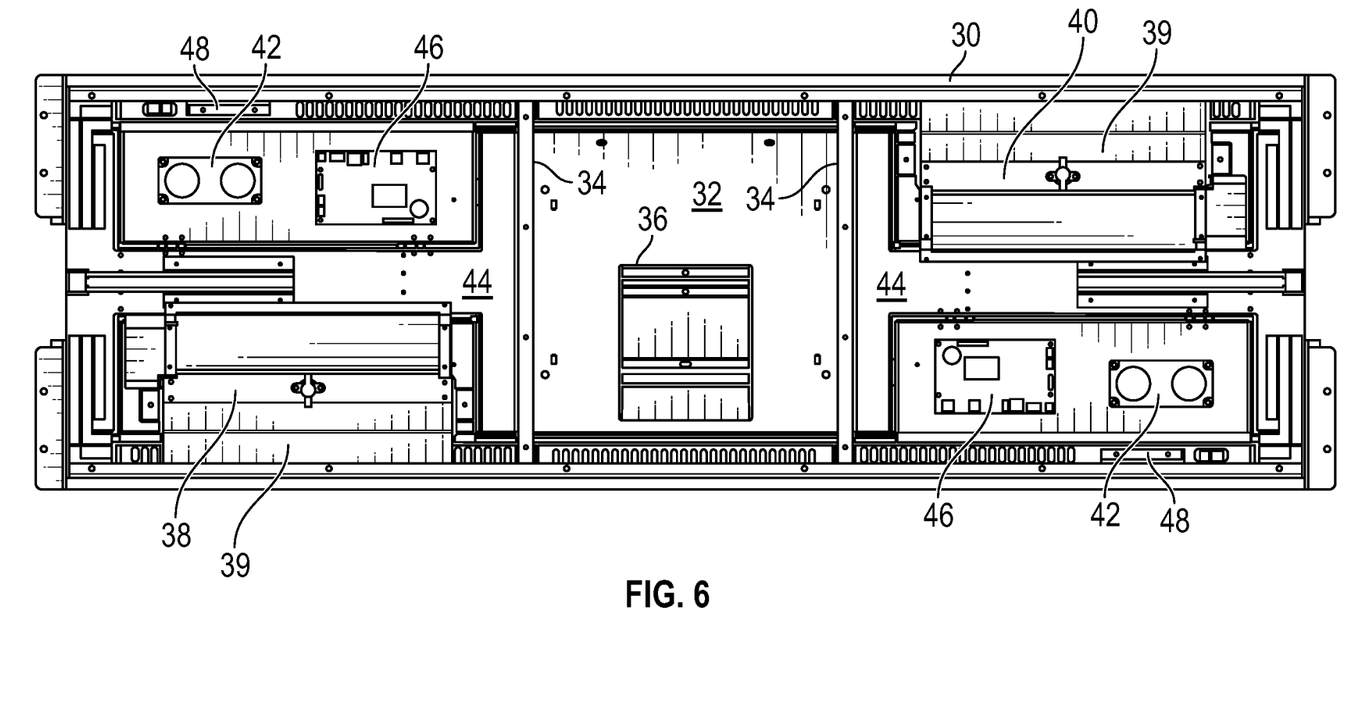
FIG. 6 illustrates a top view of the top portion.

Heater 38 is configured to heat room 1 in front of faux fireplace 10 using associated blower 39, and heater 40 is configured to heat room 2 behind faux fireplace 10 using its associated blower 39. Available heating options are as follows:

Room 1-off, Room 2-off
Room 1-off, Room 2-low
Room 1-off, Room 2-medium
Room 1-off, Room 2-high
Room 1-low, Room 2-off
Room 1-low, Room 2-low
Room 1-low, Room 2-medium
Room 1-low, Room 2-high
Room 1-medium, Room 2-off
Room 1-medium, Room 2-low
Room 1-medium, Room 2-medium
Room 1-medium, Room 2-high
Room 1-high, Room 2-off
Room 1-high, Room 2-low
Room 1-high, Room 2-medium
Room 1-high, Room 2-high FIG. 6 illustrates a top view of top portion 30. Projector cavity 32 is shown disposed between receptacles 44 and including transparent window 36. Speakers 42 are configured to generate sound in front of glass 12, and in back of glass 12 such that a user can hear generated sounds in both rooms. The top portion 30 forms a mantle on each side of glass 12, such as shown in FIG. 1 and FIG. 2. Touch controls 48 are also shown, and which may comprise of touch buttons, a touchscreen, or other types of selectors.

Figure 7:
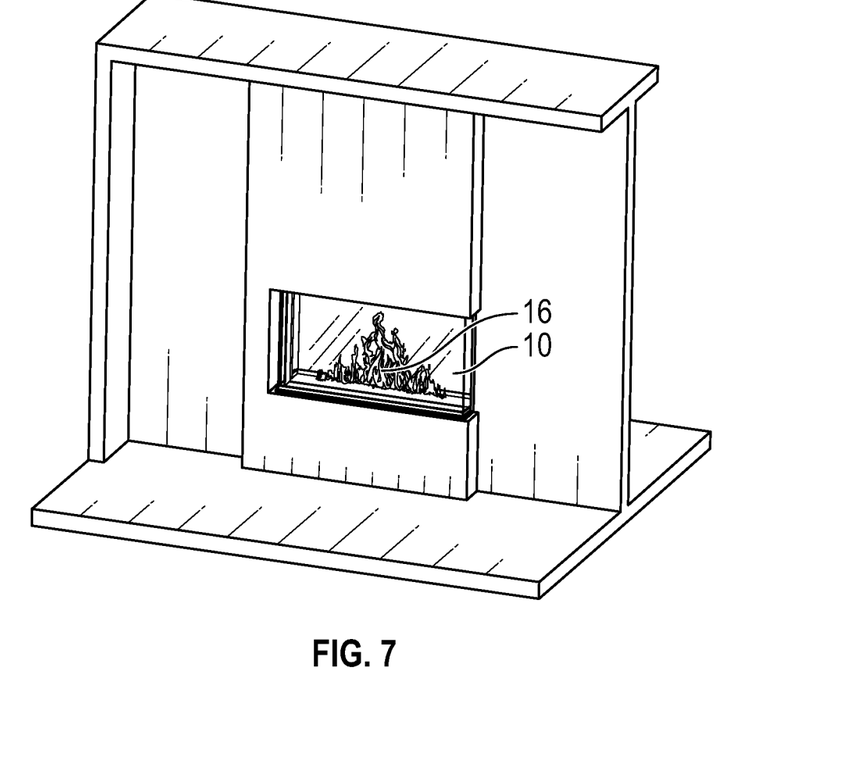
FIG. 7 illustrates another type of installation of faux fireplace.

FIG. 7 illustrates another type of installation of faux fireplace 10. The face of wall 14 extends down to faux fireplace 10, such that the glass 12 is recessed within wall 14 for a clean look where the mantle portion is embedded in wall 14. A right side of faux fireplace 10 is viewable in a corner of wall 14 such that a user positioned to a side of faux fireplace 10 can view faux flame 16. The opposing side of wall 14 is similar such that faux fireplace 10 is embedded in wall 14 without mantles.

Figure 9:
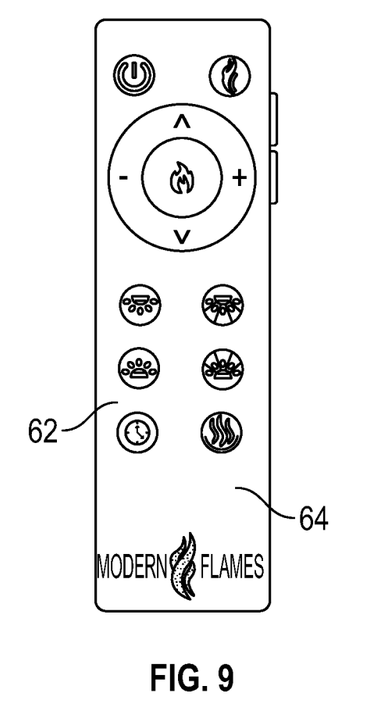
FIG. 9 is an illustration of a remote control for operating the faux fireplace.

FIG. 8 is an electrical block diagram of faux fireplace 10 including video projector 18 configured to display a looping video of faux flame 16. Controller 42, such as a processor, is controllable by a user using control panel 48 having buttons located on an upper right corner of the faux fireplace 10 as shown in FIG. 5, and by using a wireless input device 62 having a user interface 64, such as a remote control as shown in FIG. 9. A video file 66 including a looping video of the faux flame 16 is stored in memory 68. Controller 42 controls the projector 18 projecting the looping video of the faux flame 16 on glass 12, including a selectable speed of the displayed looping video. In an example, control panel 48 and the user interface 64 of the wireless input device 62 have pressable or tappable buttons. In another example, control panel 48 and user interface 64 comprise a touch display or other suitable input device.

In an example, input device 62 is a wireless smart mobile device with user interface 64 including a touch display controlled by an application (app) stored in the memory of input device 62. The wireless smart mobile device can be a smart phone, as well as a smart watch, smart eyewear, a laptop computer, and other such smart devices, Smart mobile devices control the controller 42 using standard communication protocols, such as WiFi and BlueTooth™, but can also communicate via a wireless network including the internet.

Figure 10:
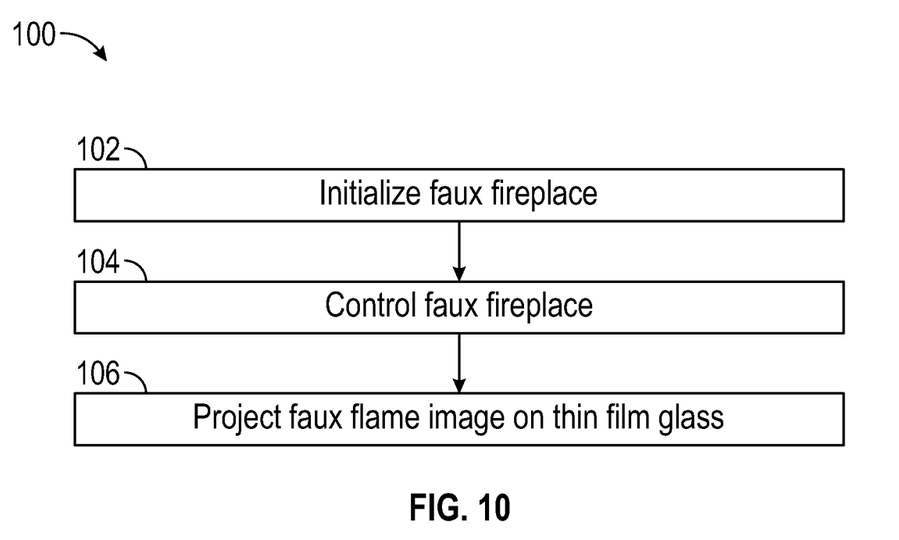
FIG. 10 is a flow diagram of method of operating the faux fireplace.

FIG. 10 is a flow diagram of method 100 for operating faux fireplace 10.

At block 102, the user initializes faux fireplace 10. This can be performed by using control panel 48 and input device 62 to power on faux fireplace 10, such as from power-off or sleep mode.

At block 104, the user uses control panel 48 or input device 62 to control faux fireplace 10. An example is choosing a video file 66 stored in memory 42, or downloaded from input device 62, to select a desired faux flame 16, choosing a speed of the video loop, and controlling heaters 38 and 40.

At block 106, ultra short-throw video projector 18 projects an image of faux flame 16 on the glass 12. Thin film 20 renders the faux flame 16 such that it is viewable from both sides of glass 12. Thin film 20 also allows a user on both sides of glass 12 to view faux flame 16, and to see objects on the other side of faux fireplace 10 via glass 12.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A faux fireplace, comprising:
   a transparent member;
   a substantially transparent film coupled to the transparent member; and
   an ultra short-throw image generator configured to generate a faux flame on the film at a throw angle of 30 degrees or less with respect to the transparent member such that faux flame is viewable by a user from each side of the transparent member.

2. The faux fireplace of claim 1, wherein the film is disposed on a surface of the transparent member.

3. The faux fireplace of claim 1, wherein the transparent member is comprised of glass.

4. The faux fireplace of claim 1, wherein the film is comprised of nano sized particles.

5. The faux fireplace of claim 1, wherein the film is at least 85% transparent.

6. The faux fireplace of claim 1, further comprising a support coupled to the image generator.

7. The faux fireplace of claim 1, wherein the faux fireplace is configured to be installed in a building wall such that the faux flame is configured to be viewable from both sides of the wall, further comprising a first heater configured to heat a first room in front of the faux fireplace, and a second heater configured to heat a second room behind the faux fireplace.

8. The faux fireplace of claim 7, wherein the transparent member has a thickness of 1" or less such that the transparent member is recessed in the wall.

9. The faux fireplace of claim 1, wherein the ultra short-throw image generator is an ultra short-throw image projector.

10. A faux fireplace, comprising:
    a transparent member;
    a substantially transparent film coupled to the transparent member; and
    a short-throw image generator configured to generate a faux flame on the film such that faux flame is viewable by a user from each side of the transparent member, further comprising a top member disposed above the transparent member and comprising a window configured to transfer the faux flame generated by the image generator.

11. A method of using a faux fireplace comprising a transparent member, a substantially transparent film coupled to the transparent member, and an ultra short-throw image generator configured to generate a faux flame at a throw angle of 30 degrees or less with respect to the transparent member on the film such that faux flame is viewable by a user from each side of the transparent member, comprising the method of:
    the image generator generating the faux flame on the film such that faux flame is viewable by a user from each side of the transparent member.

12. The method of claim 11, wherein the film is disposed on a surface of the transparent member.

13. The method of claim 11, wherein the transparent member is comprised of glass.

14. The method of claim 11, wherein the film is comprised of nano sized particles.

15. The method of claim 11, wherein the film is at least 85% transparent.

16. The method of claim 11, further comprising a support coupled to the image generator.

17. The method of claim 11, wherein the faux fireplace is installed in a building wall such that the faux flame is viewable from both sides of the wall, further comprising a first heater heating a first room in front of the faux fireplace, and a second heater heating a second room behind the faux fireplace.

18. The method of claim 17, wherein the transparent member has a thickness of 1" or less such that the transparent member is recessed in the wall.

19. The method of claim 11, wherein the ultra short-throw image generator is an ultra short-throw image projector.

20. A method of using a faux fireplace comprising a transparent member, a substantially transparent film coupled to the transparent member, and a short-throw image generator configured to generate a faux flame on the film such that faux flame is viewable by a user from each side of the transparent member, comprising the method of:
    the image generator generating the faux flame on the film such that faux flame is viewable by a user from each side of the transparent member,
    further comprising a top member disposed above the transparent member and comprising a window transferring the faux flame generated by the image generator.

* * * * *